United States Patent Office 3,270,088
Patented August 30, 1966

3,270,088
ALKYL, HYDROXYALKYL MALEATE MONOMERS AND COPOLYMERS THEREOF
Darrell D. Hicks, Louisville, Ky., assignor, by mesne assignments, to Devoe & Raynolds Company, Inc., New York, N.Y., a corporation of Delaware
No Drawing. Filed Apr. 21, 1964, Ser. No. 361,572
9 Claims. (Cl. 260—851)

This application is a continuation-in-part of my co-pending application Serial No. 117,830, filed June 19, 1961, now abandoned, which in turn is a continuation-in-part of application Serial No. 593,340, filed June 25, 1956, now U.S. Patent No. 3,002,959.

This invention relates to polymerizable hydroxy monomers, the resinous polymers prepared therefrom, and to the methods for their preparation. More particularly, this invention relates to polymerizable hydroxy monomers prepared by reacting the half ester of maleic anhydride with a monoepoxide. These monomers, when copolymerized with vinyl monomers, produce useful polyhydroxy copolymers which in turn are eminently suitable as cross-linking agents with aminoplasts, epoxides, diisocyanates, etc., to form materials useful in the coating industry.

The half ester of maleic anhydride, which is reacted with the monoepoxide to form the polymerizable hydroxy monomer of the present invention, may be represented generically by the formula:

$$HO\overset{O}{\overset{\|}{C}}CH=CH\overset{O}{\overset{\|}{C}}OR$$

in which R is a member of the group consisting of an alkyl group of 1–10 carbon atoms,

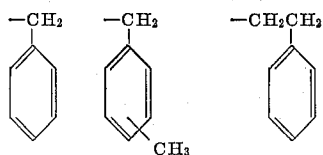

and

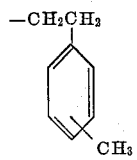

This half ester of maleic anhydride is advantageously prepared by reacting maleic anhydride with a saturated alcohol having from one to ten carbon atoms by methods well known to those skilled in the art. Aryl substituted alcohols such as benzyl alcohol, phenethyl alcohol, etc., can also be employed. Mixtures of alcohols can also be used. The R in the above formula therefore represents the residue of the alcohol which has been reacted with the maleic anhydride.

Any suitable monoepoxide can be employed in the reaction with the half ester of maleic anhydride to produce the polymerizable hydroxy monomers. Monoepoxides such as substituted alkyl compounds, as well as ethers and esters can be used. One class of polymerizable hydroxy monomer results from the reaction of the maleic anhydride half ester with a saturated hydrocarbon, ether, ester, etc. having a three-membered epoxide ring, said epoxy compound being free of other reactive groups which would interfere with the purposes of the invention. Examples are oxirane, or ethylene oxide, as well as saturated alkyl oxiranes, for instance, methyl oxirane, or propylene oxide, butene-2-oxide, etc. Among others are esters and ethers containing only one three-membered epoxide substituent, each free of other reactive groups. Examples are phenyl glycidyl ether, isopropyl glycidyl ether, butyl glycidyl ether, glycidyl benzoate, glycidyl acetate, etc.

In preparing the polymerizable hydroxy monomers, the amount of monoepoxide reacted will advantageously be that amount which is equivalent to the said groups present in the half ester of maleic anhydride. This half ester of maleic anhydride and the monoepoxide are combined in the presence of a solvent which in inert, insofar as the reactants are concerned, and refluxed until the carboxy-epoxy esterification reaction is substantially complete, as indicated by the low acid value, and a solids content approaching the theoretical for complete conversion. The reflux period generally is from 4 to 10 hours. The reflux temperature is dependent upon the boiling point of the lowest boiling substituent, and the amount of that substituent in the mixture. Thus, when propylene oxide, along with a higher boiling solvent is used, the reflux temperature is generally about 75° C. to 90° C. In general, the reaction temperature is between 60° C. and the reflux temperature of the mixture.

In reacting the half ester of maleic anhydride with the monoepoxide to form the polymerizable hydroxy monomer, any of the catalysts which are activators for epoxide-carboxyl reactions can be used. These epoxy-carboxyl catalysts are generally basic materials and are well-known in the art, for example, amines, amine salts, quaternary ammonium hydroxides and quaternary ammonium salts, such as dimethylaminomethyl phenol, benzyl trmiethyl ammonium hydroxide, benzyl trimethyl ammonium chloride, etc. Particularly useful for this purpose are the quaternary ammonium hydroxides and halides. In general the catalyst is used in the amount ranging from 0.5 to 6% by weight based on the reactants, depending upon its basicity. Weakly basic catalysts such as tertiary amines are used in quantities of from 3 to 6%, while less of the stronger bases such as primary amine is used within this range.

The vinyl compounds which may be copolymerized with the hydroxy monomers according to the present invention are those monomers which contain a single active $CH_2=C<$ group, including a terminal methylene group, which undergoes additional polymerization to produce linear polymers. Particularly important are vinyl aromatic compounds, for instance, styrene, vinyl toluene, alpha-methyl styrene, the halostyrenes, etc., having a single vinyl group, i.e., a monofunctional vinyl aromatic compound. Also valuable are saturated alcohol esters of acrylic, methacrylic and crotonic acids. Examples of monofunctional vinyl aromatic monomers are isopropenyl toluene, the various dialkyl styrenes, ortho-, meta-, and para-chloro styrene, bromo styrenes, fluoro styrenes, cyano styrenes, vinyl naphthalene, the various alpha-substituted styrenes, e.g., alpha-methyl styrenes, alpha-methyl paramethyl styrenes, as well as various di-, tri-, and tetrachloro, bromo and fluoro styrenes. Acrylic, methacrylic and crotonic esters of saturated alcohols include the methyl, ethyl, propyl, isopropyl, n-butyl, isobutyl, (sec) butyl, (tert) butyl, amyl, hexyl, heptyl, octyl, decyl, dodecyl, etc., esters of acrylic, methacrylic, and crotonic acids. Thus preferred vinyl monomers include alpha-beta unsaturated monocarboxylic acid esters of saturated monohydric alcohols, the acids having not more than four carbon atoms and the alcohols having not more than twenty carbon atoms and monofunctional vinyl aromatic compounds.

Other known vinyl monomers can, of course, be used. Desirable monomers include vinyl aliphatic cyanides of not more than four carbon atoms, for example, acrylonitrile and methacrylonitrile, as well as monovinyl ethers, e.g., ethyl vinyl ether, ethyl methallyl ether, vinyl butyl ether, methyl vinyl ether and others of not over twenty carbon atoms. Included also are unsaturated monohydric alcohol esters of saturated monobasic acids wherein the alcohols contain a single vinyl group and the acids have not more than twenty carbon atoms, for instance, vinyl acetate, vinyl stearate, and the allyl, methallyl, and crotyl esters of propionic, butyric, and other acids. Not only the vinyl monomers themselves, but mixtures of the vinyl monomers can be used. A particularly desirable mixture is a combination of an acrylic or methacrylic ester with styrene or vinyl toluene.

When the polymerizable hydroxy monomer is copolymerized with the vinyl compound, any suitable catalyst can be used, such as hydrogen peroxide and various organic peroxides, such as ascaridol, acetyl and benzoyl peroxide, dibutyryl and dilauryl peroxides, caprylyl peroxide, as well as partially oxidized aldehydes which can contain peroxide, urea peroxide, succinic acid peroxide, and the like. Other peroxides are fatty acid peroxides, such as coconut oil peroxides, stearic peroxide, lauric peroxide, and oleic peroxide. Also intended are alcoholic peroxides such as tertiary butyl hydroperoxides and other peroxides such as cumene hydroperoxide, tertiary butyl perbenzoate, hydroxyheptyl peroxide and chlorobenzoyl peroxide. In general, the amount of peroxide is 1 to 4%.

In the formation of the copolymer of the vinyl compound and the hydroxy monomer, copolymers which are particularly useful in the coating field are advantageously prepared so that the copolymer contains from about 5–75% by weight, based on the copolymer, of the hydroxy monomer. Hence, the remaining 95–25% of the copolymer is the vinyl compound.

In general, the copolymers have an average of from four to one hundred hydroxyl groups per molecule, and weights per hydroxyl group of not less than 174.

In the formation of the hydroxy monomers and the copolymers, a solvent is conveniently employed as the reaction medium. Desirable solvents for this purpose are ketones and Cellosolves, as well as aromatic hydrocarbons in combination with a ketone or Cellosolve, for example, acetone, methyl ethyl ketone, methyl isobutyl ketone, diisobutyl ketone, Cellosolve, Cellosolve acetate, and mixtures of ketones and Cellosolves with xylene, toluene, benzene, etc.

The copolymers of this invention may be cross-linked with any suitable crosslinking agent. The preferred crosslinking agents are the isocyanates, the epoxides, and aminoplasts, such as benzoguanamine, acetoguanomine and the thermosetting alcohol-modified melamine aldehyde condensation products or the condensation products of formaldehyde with urea, N,N¹-ethyleneurea, dicyandiamide, or aminotriazines which have been alkylated by an alcohol such as cyclohexanol and alkanols having 1–6 carbon atoms. The selection of the crosslinking agent and the determination of the most advantageous amounts to use can readily be determined by those skilled in the art. Preferably about 5–50% crosslinking agent is employed along with about 50–95% of the copolymer.

The hydroxy monomers of this invention are particularly useful in forming the vinyl copolymers and cross-linked vinyl copolymers described above. This usefulness is derived from the particular nature of the maleic anhydride. Maleic anhydride is a cyclic anhydride of a polymerizable dibasic acid. The reaction of maleic anhydride with an alcohol readily produces the half ester of maleic anhydride. In the subsequent reaction of the half ester with a monoepoxide, the monoepoxide reacts with the free carboxyl group of the half ester. By the use of different alcohols and different monoepoxides, a wide variety of polymerizable hydroxy monomers can be produced which are useful in producing a corresponding variety of vinyl copolymers and crosslinked vinyl copolymers having a wide range of properties. The maleic anhydride employed according to the present invention, as can be readily understood by those skilled in the art, may contain non-functional substituents, that is, chemical substituents which would not substantially interfere with the reactions herein described to subvert the purposes of the present invention.

For a further understanding of the invention, reference is made to the following specific examples, the viscosities being Gardner-Holdt viscosities run at 25° C. These examples are intended to be illustrative of the invention only, since different embodiments can be made without departing from this invention.

*Example 1*

To a suitable reaction flask equipped with a mechanical stirrer, thermometer, condenser and inlet tube were added 196 parts of maleic anhydride and 163 parts of n-butyl alcohol. Stirring was begun and heat was applied. The temperature was raised from room temperature to 125° C. over a one-hour period and was held at 120° C. to 125° C. for 1 hour and 18 minutes. 4 parts of triethyl amine catalyst were added and slow addition of 142.6 parts of propylene oxide was begun and continued for 2 hours while holding the temperature between 118° C. and 121° C. Heating was continued for 42 minutes at 120° C. to 122° C. until the acid value of the product was less than 1. In order to remove any unreacted propylene oxide or alcohol, the flask contents were heated under vacuum (25–30 mm. Hg pressure) to 120° C. The resulting product, hydroxypropyl, butyl maleate, had a Gardner-Holdt viscosity of A to B and a Gardner color of 6.

*Example 2*

To a suitable reaction flask equipped with a mechanical stirrer, thermometer, condenser, and inlet tube were added 196 parts of maleic anhydride and 70.4 parts of methyl alcohol. Stirring was begun and heat was applied. The temperature was raised from room temperature to 120° C. over a 26-minute period and was held at 120° C. for 26 minutes. No refluxing of methyl alcohol occurred during this latter heating period, indicating formation of the methyl half ester of maleic anhydride. 4 parts of triethyl amine were added to the flask contents, the temperature was lowered to 108° C. and slow addition of 142.6 parts of propylene oxide was begun. The propylene oxide was added to the reactants over one hour and sixteen minutes, the rate of addition being controlled so as to keep the temperature at about 100° C. with a moderate reflux. Heating was continued for two hours while the temperature slowly rose to 120° C. No refluxing occurred at this temperature (120° C.) indicating complete reaction. In order to remove any unreacted propylene oxide or low boiling by-products, the flask contents were heated under vacuum (25–30 mm. Hg pressure) to 120° C. The resulting product, hydroxypropyl, methyl maleate, had a Gardner-Holdt viscosity of B, a Gardner color of 1 to 2 and a pH of approximately 7.

*Example 3*

To a suitable reaction flask equipped with a mechanical stirrer, reflux condenser, thermometer, and dropping funnel were added 86 parts of xylene. To the dropping funnel were added 100 parts of ethyl acrylate, 60 parts of styrene, 40 parts of 2-hydroxypropyl methyl maleate, and 4 parts of di-tertiary butyl peroxide. Heat was applied to the flask raising the temperature of the solvent to 128° C. Addition of monomer-catalyst solution was begun and was continued for 1 hour and 43 minutes while holding the temperature between 124° C. and 128° C. Heating was continued at 126° C. to 130° C. for 5 hours. 2 parts of di-tertiary butyl peroxide were added to flask contents and heating was continued at 126° C. to 130° C. for 3 hours. The clear viscous copolymer solution had a solids content of 65.2% indicating 93.1% conversion of monomers to polymers.

24.6 parts of the copolymer solution were blended with 8 parts of an isobutylated melamine formaldehyde resin at 50% solids in isobutanol. The blend was further reduced to application viscosity with 7.4 parts of ethylene glycol monoethyl ether acetate and 10 parts of n-butanol. Films were prepared on glass using a 3 mil drawdown blade. After a 30 minute bake at 180° C., the films were cured and had very good adhesion and fair mar resistance.

Another blend was prepared using 23 parts of the copolymer solution and 8.3 parts of a butylated urea-formaldehyde resin at 60% solids in xylene and n-butanol, with 23.7 parts of the monoethyl ether of propylene glycol. Films prepared on glass were baked at 180° C. for 30 minutes. Well cured clear films resulted which had good adhesion and flexibility and fairly good mar resistance.

24.6 parts of the copolymer solution were blended with 4 parts of hexamethoxymethyl melamine and 11.4 parts of xylene. Films were prepared on glass using a 3 mil drawdown blade. After heating for 30 minutes at 180° C., clear cured films were obtained.

Films prepared from the above blend with the addition of 1% (based on copolymer-aminoplast solids) of a 20% solution of p-toluene sulfonic acid in ethanol and after a 30 minute bake at 180° C. were cured better than the films which had no catalyst added to the blend, having improved mar resistance and hardness. Use of 2 and 3 times as much catalyst produced films of increasing hardness and mar-resistance.

*Example 4*

To a suitable reaction flask equipped as described in Example 3 were added 86 parts of xylene. To the dropping funnel were added 60 parts of methyl acrylate, 40 parts of butyl acrylate, 60 parts of vinyl acetate, 40 parts of butyl-2-hydroxypropyl maleate and 4 parts of benzoyl peroxide. Heat was applied to the flask and at 120° C. addition of the monomer catalyst solution was begun. The monomer-catalyst addition was continued over a period of 2 hours and 16 minutes while holding the temperature between 114° C. and 120° C. Heating 114° C. and 120° C. was continued for 6 hours. 2 parts of benzoyl peroxide catalyst were added and heating at the same temperatures was continued for 2 hours and 30 minutes. The resulting copolymer solution had a solids content of 64.4% indicating 92% conversion of monomers to polymers.

24.9 parts of the copolymer solution were blended with 8 parts of an isobutylated melamine-formaldehyde resin at 50% solids in isobutanol. The blend was reduced to application viscosity with 17.1 parts of n-butanol. Films were prepared on glass using a 3 mil drawdown blade. After a 30 minute bake at 180° C., cured films were obtained.

23.3 parts of the copolymer solution were blended with 8.3 parts of a butylated urea-formaldehyde resin at 60% solids in n-butanol and xylene. After the addition of 18.4 parts of the monomethyl ether of propylene glycol, films were prepared on glass using a 3 mil drawdown blade. After a 30 minute bake at 180° C., cured films were obtained.

*Example 5*

Using the same procedure as described in Examples 3 and 4, a copolymer was prepared from 60 parts methyl acrylate, 40 parts butyl acrylate, 60 parts vinyl toluene, and 40 parts butyl-2-hydroxypropyl maleate in 200 parts of xylene using 6 parts di-tertiary butyl peroxide catalyst. The resulting copolymer solution had a solids content of 46.4% indicating 92.8% conversion of monomers to polymers.

34.5 parts of the copolymer solution were blended with 8 parts of an isobutylated melamine-formaldehyde resin at 50% solids in isobutanol. After the addition of 7.5 parts of n-butanol, 3 mil films were prepared on glass. Cured films were obtained after a 30 minute bake at 180° C.

32.4 parts of the copolymer solution were blended with 8.3 parts of a butylated urea-formaldehyde resin at 60% solids in n-butanol and xylene. After the addition of 14.3 parts of the monomethyl ether of propylene glycol, 3 mil films were prepared on glass. Clear, well cured films having good adhesion and flexibility were obtained after a 30 minute bake at 150° C.

I claim:

1. A hydroxy monomer comprising the addition product of (a) a monoepoxide and (b) a maleic anhydride half ester having the formula $$HO\overset{O}{\overset{\|}{C}}CH=CH\overset{O}{\overset{\|}{C}}OR$$

in which R is a member of the group consisting of an alkyl group of 1–10 carbon atoms,

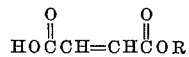

and

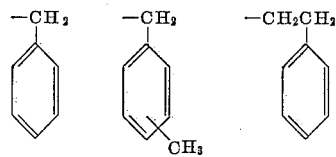

2. The hydroxy monomer of claim 1 in which the monoepoxide is propylene oxide and R is a butyl group.

3. The hydroxy monomer of claim 1 in which the monoepoxide is propylene oxide and R is a methyl group.

4. A copolymer of (a) the addition product of (1) a monoepoxide and (2) a maleic anhydride half ester having the formula $$HO\overset{O}{\overset{\|}{C}}CH=CH\overset{O}{\overset{\|}{C}}OR$$

in which R is a member of the group consisting of an alkyl group of 1–10 carbon atoms, and and (b) at least one different ethylenically unsaturated monomer copolymerizable with said addition product.

5. The copolymer of claim 4 in which the addition product comprises about 5–75% by weight of the copolymer and the different ethylenically unsaturated monomer comprises about 95–25% by weight of the copolymer.

6. A composition comprising a compatible mixture of (a) a copolymer of a mixture of (1) the addition product of a monoepoxide and a maleic anhydride half ester having the formula $$HO\overset{O}{\overset{\|}{C}}CH=CH\overset{O}{\overset{\|}{C}}OR$$

in which R is a member of the group consisting of an alkyl group of 1–10 carbon atoms,

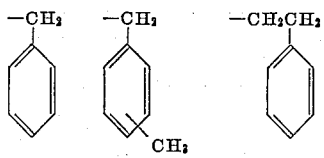

and

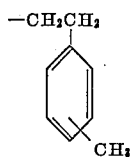

and (2) at least one different ethylenically unsaturated monomer copolymerizable with said addition product and (b) a cross-linking agent.

7. The composition of claim 6 in which the copolymer comprises about 50–95% of the composition by weight and the cross-linking agent comprises about 5–50% of the composition by weight.

8. The composition of claim 7 in which the cross-linking agent is an alkylated aminoplast resin.

9. The process which comprises heating a maleic anhydride half ester having the formula

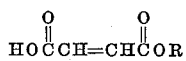

in which R is a member of the group consisting of an alkyl group of 1–10 carbon atoms,

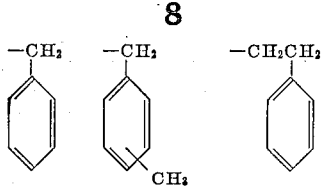

and

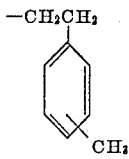

with a monoepoxide to effect a reaction between the epoxide group of the monoepoxide and the carboxyl group of the maleic anhydride half ester.

References Cited by the Examiner

UNITED STATES PATENTS

| | | | |
|---|---|---|---|
| 3,002,959 | 10/1961 | Hicks | 260—85.5 |
| 3,069,376 | 12/1962 | Cline | 260—29.6 |
| 3,082,184 | 3/1963 | Falgiatore | 260—856 |

MURRAY TILLMAN, *Primary Examiner.*

SAMUEL H. BLECH, *Examiner.*

P. LIEBERMAN, *Assistant Examiner.*